May 10, 1932.     G. D. THATCHER     1,858,122
EMERGENCY BRAKE
Filed April 1, 1929     2 Sheets-Sheet 1
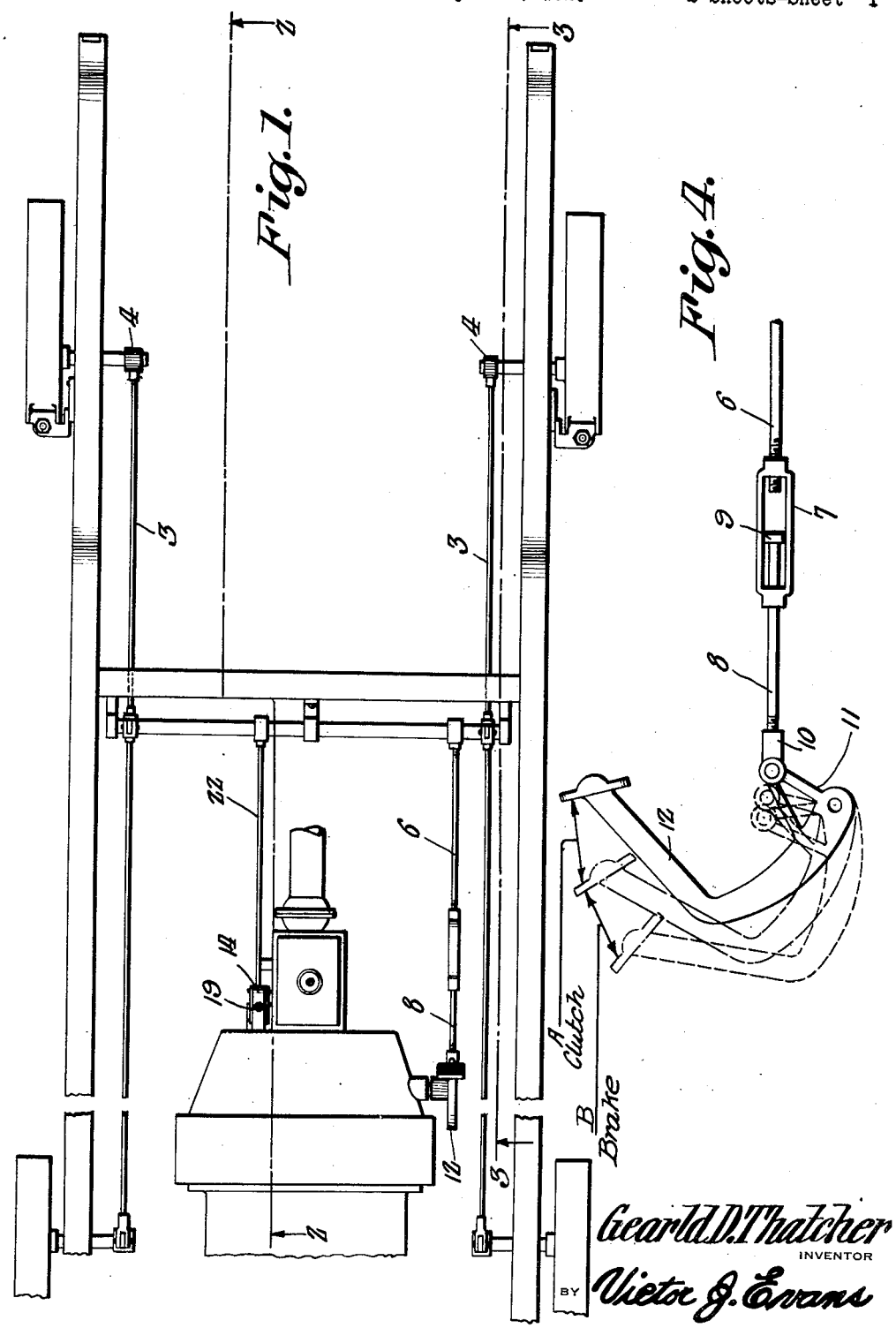

May 10, 1932.  G. D. THATCHER  1,858,122
EMERGENCY BRAKE
Filed April 1, 1929  2 Sheets-Sheet 2
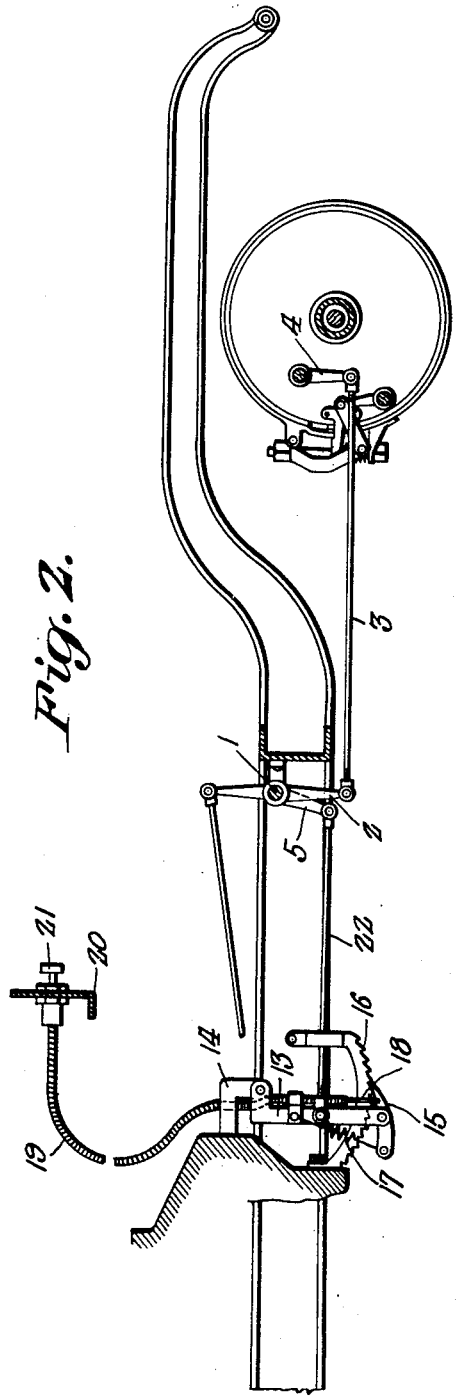
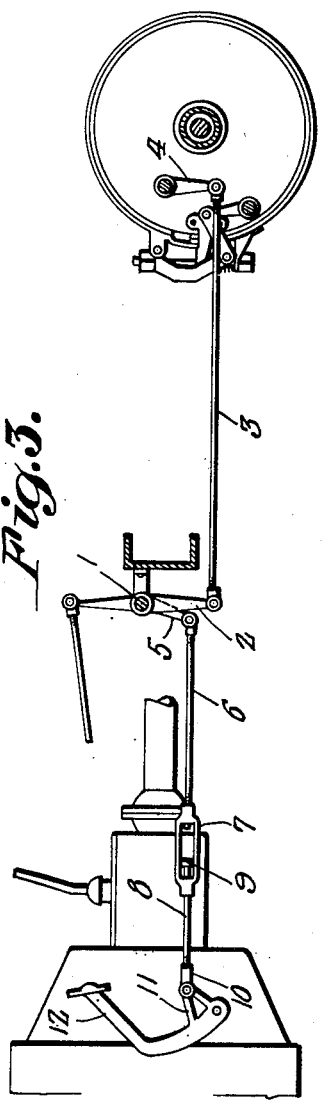
Gearld D. Thatcher
INVENTOR
BY Victor J. Evans
ATTORNEY Patented May 10, 1932

1,858,122

UNITED STATES PATENT OFFICE

GEARLD DEAN THATCHER, OF SYRACUSE, NEW YORK

EMERGENCY BRAKE

Application filed April 1, 1929. Serial No. 351,760.

This invention relates to an emergency brake for motor vehicles and the like, the general object of the invention being to provide means whereby the brakes are applied by the clutch pedal after the same has been moved to clutch releasing position, with hand operated means for holding the brakes applied, such means enabling the pedal to be released without removing the emergency brakes.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of a portion of the chassis of a motor vehicle, showing the invention in use.

Figure 2 is a section on line 2—2 of Figure 1.

Figure 3 is a section on line 3—3 of Figure 1.

Figure 4 is a diagrammatic view showing the various positions of the clutch pedal.

In these drawings, the numeral 1 indicates the transverse shaft which carries the arms 2 to which the links 3 are connected which extend to the arms 4 of the emergency brakes of the wheels of the vehicle. The drawings show the invention applied to a vehicle having a brake on each wheel thereof, though it will be understood that it can be used with vehicles having brakes on but two wheels. This shaft 1 also carries a pair of depending arms 5, one of which has a link 6 adjustably and pivotally connected therewith, the front end of the link being threaded to engage a threaded part of a turnbuckle 7, the other end of the turnbuckle being unthreaded so as to slidingly receive a link 8 which has an enlarged rear end 9 so that the link can slide in the turnbuckle, but is limited in its forward movement by the enlargement 9 striking a part of the turnbuckle. The front end of this link 8 is threaded to engage a socket member 10 which is pivoted to a bracket 11 formed with or connected to the lower part of the clutch pedal 12 of the vehicle. These parts are so arranged that when the pedal is moved from its neutral position to the clutch releasing position, no pull will come on the link 6, as the link 8 simply slides in the turnbuckle and thus there is no movement of the emergency brakes. This movement of the clutch pedal is shown at A in Figure 4. However, when the clutch pedal is further depressed, as shown at B in Figure 4, the turnbuckle and link 6 will be caused to move with the pedal, as the enlargement 9 is in engagement with the front end of the turnbuckle and, therefore, this movement of the pedal will act to rock the shaft 1 and apply the emergency brakes. Of course, by holding the clutch pedal in fully depressed position, the emergency brakes will remain applied, but as soon as the pedal is released, the brakes will be released.

In order to hold the brakes applied after the clutch pedal has been released, I provide a depending member 13 of inverted L shape which has its short upper arm pivoted to a bracket 14 connected with a part of the power plant, and the lower end of this member has a dog 15 pivoted thereto which operates over a quadrant 16 fastened to a part of the power plant, the dog being normally held out of engagement with the teeth of the quadrant by a spring 17 and said dog may be held in engagement with one of the teeth of the quadrant by a flexible wire 18 connected with the dog and passing through a flexible tube 19 to a point on the dash 20 of the vehicle, where the wire is formed with a handle 21. The member 13 is connected with a second depending arm 5 of the shaft 1 by a link 22 so that as the shaft 1 is rocked by the clutch pedal, the member 13 is swung forwardly by the link 22 and then by pulling upon the wire 18, the dog will be raised into engagement with one of the teeth of the quadrant and thus the shaft 1 will be locked in a position with the emergency brakes applied and the clutch pedal can be released without releasing the emergency brakes. It will, of course, be understood that when the emergency brakes are to be held applied, the shifting lever must be moved to neutral position before the clutch pedal is released.

As will be seen, the strain on all of the rods is a pulling one, for as the rod 22 is pushed to move the member 13, the actual force of the strain on said rod, when the brakes are applied, is a pulling one.

This invention eliminates the use of an emergency lever, thus saving the space taken up by said lever, and the emergency brakes are applied by the clutch pedal as the same is moved to clutch releasing position so that the emergency brakes can be applied much quicker than they can when operated by an emergency lever. The brakes can be released by simply releasing the clutch or if it is desired to hold the brakes applied for some time, then the wire 18 can be pulled to raise the dog 15 into engagement with the quadrant, which will lock the parts with the brakes applied. By pushing upon the wire, the dog is swung away from the quadrant and the parts will return to brake releasing position.

There may be a spring put at any convenient place for the purpose of pulling the brake rods to a released position. The rod running from the clutch to the cross shaft or the emergency brakes, as shown, may be connected to the regular foot brake bands for cars not having separate emergency brakes. The clutch rod is to be connected to any braking power that now connects to the emergency brake handle, such as an emergency brake band on the drive shaft or any other convenient means of an emergency brake that does not work from the rear or front wheels. Also, the teeth on the quadrant should be placed so that the dog will engage the last tooth when the clutch pedal is about one-half inch from the floor boards to provide room for the clutch pedal to be depressed to take the strain off of the dog so that it may be disengaged from the teeth by the choke wire running to the dashboard.

Advantages of this clutch-operated emergency brake system:—

It does away with the emergency brake handle which is always in the way and unhandy to get to when needed.

It is always advisable to release the clutch when applying the emergency brake, which this does with one operation.

It takes up less space and gives more room for the driver and occupants of the front seat, and if the driver has to apply the emergency brakes with this system, the occupants' knees are not in the way, which they most generally are with the emergency handle.

It is much easier to operate the emergency brakes, as persons have more strength in their legs than in their arms.

Being easier to operate, it gives smoother control in applying and releasing the emergency brakes.

It prevents rolling backwardly or forwardly when shifting gears on a steep grade, for as the car is brought to a stop with the clutch in a neutral position and the foot on the foot brakes, when ready to go ahead, the clutch is pressed in a little way, applying the emergency brake to hold the car while the foot leaves the foot brake to travel to the gas pedal, thereby letting the car go on up the hill without any trouble, which gives more confidence to a nervous driver.

It is a quicker system in applying the emergency brake than the former system, as the foot only has to travel half the distance using the clutch pedal as the hand must travel using the hand lever; also, less movements are required.

With movements and distance saved, the driver should be able to apply the emergency brakes with the clutch pedal at least one second quicker, which means if a car were going forty-five miles per hour, it would be traveling fifty-eight feet per second. Therefore, if the driver can apply his emergency brakes one second quicker, he would be able to bring his car to a stop in fifty-eight feet less distance. This would greatly increase the safety of the driver and occupants of the car and the public.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with the emergency brakes of a vehicle, means for applying such brakes by the clutch pedal of a vehicle and manually operated means for holding the brakes in applied position so that the pedal can be released without releasing the brakes.

2. In combination with a vehicle and its emergency brakes, including a shaft, a depending arm on said shaft, a link pivotally and adjustably connected with said arm, a turnbuckle into which the link is threaded, a second link slidably arranged in the buckle and having an enlarged end located in the buckle, a bracket connected with the clutch pedal, a socket member pivoted to the bracket and threaded to receive the threaded front end of the slidable link whereby upon depression of the clutch pedal to a position beyond clutch releasing position, the emergency brakes will be applied.

3. In combination with a vehicle and its emergency brakes and including a shaft to which the brake arms are connected, a pair of depending arms on the shaft, means for connecting one arm with the clutch pedal whereby the pedal can be depressed to release the clutch without applying the brakes and further movement of the pedal will apply the brakes, a link connected with the second depending arm, a pivoted dog carrying member connected to the front end of said link, a toothed quadrant over which the dog operates, a spring for normally holding the dog out of engagement with the teeth of the quadrant and manually operated means for moving and holding the dog in engagement with the teeth of the quadrant to hold the brakes in applied position.

4. In a vehicle control mechanism, the combination with a common control element operatively connected to the clutch and brake and movable in one direction to apply the brake and disengage the clutch, of means for locking said brake in applied position while permitting said control element to return to its normal position for re-engaging the clutch.

5. In a vehicle control mechanism, the combination with a clutch and brake control member movable in one direction to actuate the clutch and apply the brake, of means for locking the brake in applied position while permitting said member and clutch to return to normal position, and means for releasing said locking means.

6. In a vehicle control mechanism, the combination with a clutch and brake control element movable in one direction to apply the brake and actuate the clutch, of means for locking the brake in applied position, and automatically operable releasing means for said locking means requiring for its operation the manipulation of another control.

7. In a vehicle control mechanism, the combination with a single control element for actuating both the clutch and brake, of locking mechanism for the brake including a ratchet bar and a dog engageable therewith, a second control element and means operable upon manipulation of the second control element for placing a releasing tension upon said dog.

In testimony whereof I affix my signature.

GEARLD DEAN THATCHER.